(12) United States Patent
Brewington et al.

(10) Patent No.: US 8,894,196 B2
(45) Date of Patent: Nov. 25, 2014

(54) DECORATIVE CONCRETE SURFACES

(71) Applicant: Xerox Corporation, Norwalk, CT (US)

(72) Inventors: Grace T. Brewington, Fairport, NY (US); Bin Zhang, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/661,304

(22) Filed: Oct. 26, 2012

(65) Prior Publication Data

US 2014/0120325 A1 May 1, 2014

(51) Int. Cl.
*B41J 2/01* (2006.01)
(52) U.S. Cl.
USPC ............................. 347/101; 347/102; 347/103
(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ............ 347/103, 101, 88, 99, 102, 105, 100, 347/95; 428/195, 32.1
See application file for complete search history.

(56) References Cited

U.S. PATENT DOCUMENTS

| | | | | |
|---|---|---|---|---|
| 3,277,541 A * | 10/1966 | Wilton et al. | .................. | 430/320 |
| 3,403,621 A * | 10/1968 | Hurwitz et al. | .................. | 101/23 |
| 3,975,223 A * | 8/1976 | Turoff | .............................. | 156/85 |
| 4,354,851 A * | 10/1982 | Hix et al. | ................... | 428/904.4 |
| 5,916,662 A * | 6/1999 | Schmidt | ......................... | 428/141 |
| 6,153,038 A * | 11/2000 | Brooker | ......................... | 156/230 |
| 6,569,277 B1 * | 5/2003 | Gibbs | ........................... | 156/240 |
| 6,686,315 B1 * | 2/2004 | Creed | ........................... | 503/227 |
| 7,958,822 B2 * | 6/2011 | Sims | .............................. | 101/492 |
| 2007/0196120 A1 * | 8/2007 | Maeda | ............................ | 399/69 |
| 2008/0277630 A1 * | 11/2008 | Kiyoshima et al. | ............ | 523/161 |
| 2012/0164402 A1 * | 6/2012 | Murakami et al. | ............ | 347/102 |

* cited by examiner

Primary Examiner — Manish S Shah
(74) Attorney, Agent, or Firm — Simpson & Simpson, PLLC

(57) ABSTRACT

A method for applying an image on a concrete substrate wherein the image forms a decorative coating. The method includes depositing the image on the concrete substrate using an inkjet printing device.

7 Claims, 4 Drawing Sheets

DECORATIVE CONCRETE SURFACES

TECHNICAL FIELD

The presently disclosed embodiments are directed to providing a system and method for forming decorative surfaces, in particular, a system and method for forming decorative surfaces on a concrete substrate.

BACKGROUND

Concrete is emerging as a popular manufactured material for countertops, work surfaces, paver stones, etc., competing as an alternative to laminates and granite. Granite surfaces possess known weaknesses, e.g., edges easily chip, and such weaknesses may require the replacement of an entire area of a granite surface. Moreover, unless the replacement piece of granite is carefully selected, color matching to an older granite piece may be extremely difficult.

Concrete offers a variety of benefits that cannot be provided by granite. Concrete is less expensive to use than granite. Moreover, the batch to batch matching of color is easier to accomplish with concrete. Alternatively, the color of concrete surfaces can be matched by employing known coating processes.

Concrete surfaces are currently decorated by incorporating pigments or other colorants into the concrete mix before the concrete is applied or poured. This method can provide a colored surface, but is not capable of more intricate patterning or imaging. Formed or poured concrete surfaces are currently decorated by stains, tints and/or dyes applied by coating techniques including but not limited to wiping, brush coating and/or spray coating. Brush coating and spray coating can provide intricate patterns or images, but require careful application by an artisan. Patterns produced by artisans inherently are one-of-a-kind, thus the end customer cannot see the pattern or image until it is produced. Moreover, spray coating requires an optimum distance between the spray head and the surface to be coated, i.e., the appearance of the coating layer changes as the distance changes. Concrete presents a variety of characteristics which must be accounted for when coating its surface: irregular surface shapes such as corners; irregular surface textures, i.e., roughness; and, irregular initial surface coloring caused by the components that form the concrete.

In view of the foregoing, it is apparent that there is a need for systems and processes for decorating concrete surfaces with intricate patterning or images which can be pre-selected and approved by the end customer, and can be reproduced consistently should more than one copy of a pattern be desired. The present disclosure addresses such needs.

SUMMARY

The present disclosure sets forth processes, materials and systems that use inkjet digital printing or electrophotographic printing to decorate concrete surfaces. As described infra, known stains, pigments and dyes for use with concrete are formulated into inks compatible with inkjet systems, using the appropriate binders, surfactants, viscosity agents, etc. In some embodiments, current inkjet inks or electrophotographic toners are used. The present system includes a modified wide body, flat bed inkjet systems, and in some embodiments includes the addition of adjustable angle printheads for printing such surfaces as an edge and/or backsplash. In some embodiments, the present printing system includes color controls/sensors to measure the incoming color of the concrete substrate and to correct the digital image color. In some embodiments, the image is printed on a transfer sheet in an inkjet system or electrophotographic system, and subsequently the image is transferred to a concrete surface using heat and pressure.

According to aspects illustrated herein, there is provided a method for applying an image on a concrete substrate wherein the image forms a decorative coating. The method includes depositing the image on the concrete substrate using an inkjet printing device.

According to other aspects illustrated herein, there is provided a method for applying an image on a concrete substrate wherein the image forms a decorative coating. The method includes depositing at least a portion of the image on a first transfer sheet; and, securing the first transfer sheet to the concrete substrate.

According to still other aspects illustrated herein, there is provided a decorative concrete surface including a concrete substrate and a transfer sheet having a printed image thereon, wherein the transfer sheet is secured to the concrete substrate.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1A:
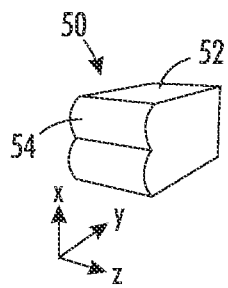
FIG. 1A is a perspective view of an example of a concrete surface having a complex exterior edge.

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, "image" and "printed image" is intended to be broadly construed as any picture, text, character, indicia, pattern or any other printed matter. Printed images can include but are not limited to logos, emblems and symbols. As used herein, "puzzle cuts" is intended to mean any complex, non-uniform edge of a first transfer sheet configured to is complimentarily match a complex, non-uniform edge of a second transfer sheet to form at least a portion of an image. As used herein, x-y-z coordinate axes are used to refer to particular orthogonal directions as depicted in the various figures.

Furthermore, as used herein, "inkjet" and "inkjet printing system" are intended to mean a printing device wherein liquid or solid ink is transferred to a substrate in a predetermined arrangement. Moreover, the words "printer," "printer system", "printing system", "printer device" and "printing device" as used herein encompasses any apparatus, such as a digital copier, bookmaking machine, facsimile machine, multi-function machine, etc. which performs a print outputting function for any purpose. Additionally, as used herein, "sheet," "sheet of paper" and "paper" refer to, for example, paper, transparencies, parchment, film, fabric, plastic, photo-finishing papers or other coated or non-coated substrate media in the form of a web upon which information or markings can be visualized and/or reproduced. Moreover, as used herein, "full width array" is intended to mean an array or plurality of arrays of photosensors having a length equal or greater than the width of the substrate to be coated, for example, similar to the full width array taught in U.S. Pat. No. 5,148,268. As used herein, the term "average" shall be construed broadly to include any calculation in which a result datum or decision is obtained based on a plurality of input data, which can include but is not limited to, weighted averages, yes or no decisions based on rolling inputs, etc.

Moreover, although any methods, devices or materials similar or equivalent to those described herein can be used in the practice or testing of these embodiments, some embodiments of methods, devices, and materials are now described.

The present disclosure sets forth processes, materials and systems that use inkjet digital and electrophotographic printing to decorate concrete surfaces. Known stains, pigments and dyes are formulated into inks compatible with inkjet systems, for example, by using the appropriate binders, surfactants, viscosity agents, etc. In alternative configurations, current inkjet inks are used, where such inks are selected from the group consisting of: aqueous, solvent, wax based solid, and gel inks. It is believed that solid and gel inks have the advantage of achieving more vibrant color using less ink because the ink sits on or near the surface of the substrate rather than soaking into the concrete.

A modified wide body, flat bed inkjet system is used to apply decorative images to a concrete substrate. For concrete substrates that include surfaces arranged at multiple planes of orientation, the flat bed inkjet system may be modified with the addition of adjustable angle printheads for printing on the various planes, e.g., the main surfaces, edges and backsplash.

Figure 1B:
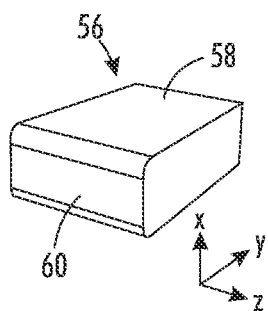
FIG. 1B is a perspective view of another example of a concrete surface having a complex exterior edge.
Figure 1C:
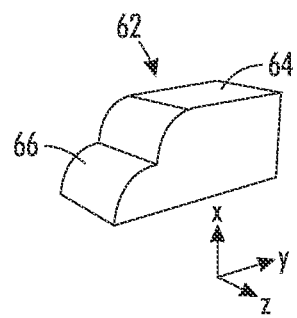
FIG. 1C is a perspective view of yet another example of a concrete surface to having a complex exterior edge.
Figure 2:
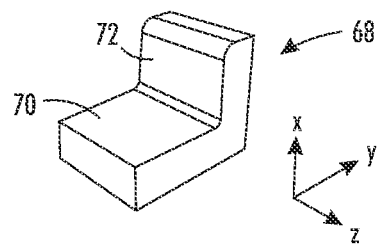
FIG. 2 is a perspective view of an example of a concrete surface having a backsplash portion.

In some embodiments, the flat bed inkjet system comprises a stationary printhead array configured to simultaneously print images on an entire surface, e.g., an edge or backsplash. In some embodiments, the positions of the printheads can be preset for different edge or surface shapes. Although concrete will not have the surface smoothness and flatness of paper and film substrates commonly used for inkjet document printing, the image quality acceptable for concrete is much more forgiving of dot size variation. Examples of edges configurations are shown in FIGS. 1A through 1C, while an example of a backsplash is depicted in FIG. 2. In view of these examples, one of ordinary skill in the art will appreciate that multiple angles are required for printing an image on the entire substrate surface.

FIG. 1A shows a portion of concrete substrate 50 having upper surface 52 and edge 54. FIG. 1B shows a portion of concrete substrate 56 having upper surface 58 and edge 60. FIG. 1C shows a portion of concrete substrate 62 having upper surface 64 and edge 66. While FIG. 2 shows a portion of concrete substrate 68 having upper surface 70 and backsplash 72. FIGS. 1A through 2 each include x-y-z coordinate axes.

Figure 3A:
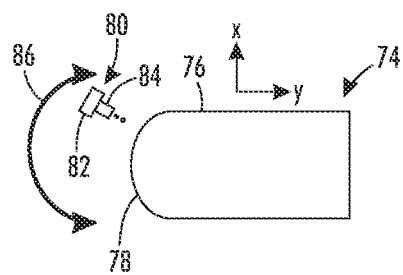
FIG. 3A is a side elevational view of a concrete surface having a variable positioned angularly disposed print head configured to coat or paint the exterior edge of a concrete surface by sweeping the exterior edge.
Figure 3B:
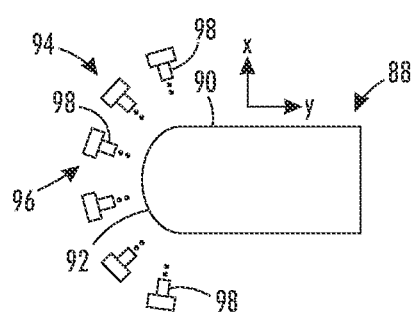
FIG. 3B is a side elevational view of a concrete surface having a fixed set of angularly disposed print heads configured to coat or paint the exterior edge of a concrete surface.

FIG. 3A shows a cross-sectional portion of concrete substrate 74 having upper surface 76 and edge 78. In this embodiment, edge 78 is coated or painted using inkjet system 80 which comprises moveable printhead 82 comprising printhead element 84. Printhead 82 is configured to sweep back and firth generally along the directions depicted by bidirectional arrow 86. FIG. 3B shows a cross-sectional portion of concrete substrate 88 having upper surface 90 and edge 92. In this embodiment, edge 92 is coated or painted using inkjet system 94 which comprises fixed printhead 96 comprising plurality of printhead elements 98. Each of FIGS. 3A and 3B include x-y axes while the z axis is oriented perpendicular relative to the plane of the page. It should be appreciated that both embodiments depicted in FIGS. 3A and 39 also address coating or painting the concrete substrates along an axis that is oriented into and out of the plane of the figures, i.e., the z axis. In some embodiments, printhead 82 or plurality of printheads 96 move along the z axis oriented into and out of the plane of the figures, while in other embodiments printhead 82 comprises multiple printhead elements 84 arranged along the z axis oriented into and out of the plane of the figures, and in still further embodiments, printhead 96 comprises multiple sets of plurality of printhead elements 98 with each set of a plurality of printhead elements 98 arranged along the z axis oriented into and out of the plane of the figures. Such embodiments permit the coating or painting of the entire length of the edge of the concrete substrate.

It should be appreciated that the present inkjet printing system possesses tight tolerances on the distance between the print heads and surface to be coated, and such tolerances are much tighter than known spray coating systems. As described above, the present system is capable of accommodating curved surfaces and complex shapes. It has been found that since natural irregularities have been deemed to be acceptable, e.g., the irregularities present in granite, variation in the distance between the print head and the substrate is acceptable as it results in similar irregularities. Moreover, the present system can modify the print head location thereby maintaining the print head to substrate distance by accounting for the variations in the substrate such as roughness and/or curvature.

In some embodiments, the present printing system includes color controls and/or sensors to measure the incoming color of the concrete substrate and correct the printed digital image color so that the image remains consistent over the entire length of the substrate, and remains consistent from substrate to substrate. For example, a color spectrophotometer may be used to measure the initial color of the concrete substrate, and may be further used to measure intermediate or final colors of the coated or painted substrate. In some embodiments, a full width array of photosensors may be used to measure and map out the color of the concrete substrate, mapping out point-wise color variation associated with the various aggregate and binder materials in the concrete substrate. The printed image may then be corrected on a point-wise to basis for the color of the substrate. Use of such color controls provides an advantage when employing the present system and method for coating a substrate. The foregoing color controls permit the present system and method to be more consistent than existing artisan applications, or in other words provide more consistent quantity and type of color applied, more consistent image to image reproduction and further provide the ability to produce an advance proof of an image prior to printing on a substrate.

For some images, a base or primer coating may be applied to create a consistent starting surface upon which a printed image may subsequently be applied. For example, white ink may be applied as a first layer on the concrete substrate, either as a flood coating or a digital coating, depending on the appearance of the final image. Furthermore, as one of ordinary skill in the art will appreciate, other base coatings may be applied depending on the characteristics of the desired printed image. In other words, if the printed image is predominantly blue in color, a base coating may be blue thereby providing a complimentary starting color.

In some embodiments, depending on the final desired appearance, white or lighter color concrete may be used. White or lighter color concrete uses white Portland cement in combination with white sand. Such white and lighter color concretes are well known in the concrete industry. It is further contemplated that colored sands other than white sand may be used to effect the initial coloring of the concrete substrate.

In some embodiments, color test patches may be printed and subsequently imaged on a test concrete substrate piece for calibration and control of the present printing system color output. The foregoing technique is similar to known color calibration processes for printing documents on paper.

In some embodiments, an image is printed on a transfer sheet in an inkjet system or an electrophotographic system and the image is subsequently transferred to the concrete surface using heat and pressure. The transfer sheet may be applied to previously installed substrates or upon formation of the substrate. Transfer sheets having surfaces designed for particular inks or toners already exist, but are typically optimized for new inks and toners. A present transfer sheet surface includes heat and pressure sensitive adhesives, for example, ethylene vinyl acetate (EVA). In some embodiments of transfer sheets, the adhesive transfers to the substrate when a liner layer is removed. In some embodiments of the present transfer sheets, the surface of the transfer sheet releases the toner or ink when the liner is removed. In some embodiments, the transfer sheet comprises a liner material layer, then an EVA layer, and last an ink layer. In such embodiments, the EVA layer carriers the ink or toner and is adhered to the substrate, then subsequently the liner layer is removed, i.e., the liner layer is arranged as the furthest surface from the concrete substrate. Examples of transfer sheets known in the textile industry transfer an image at about 375 degrees Fahrenheit (° F.) and 80 pounds per square inch (psi). Such heat and pressure conditions may be obtained with a heated platen, a heated roller or a heated blade application of pressure to the present image transfer sheet, thereby causing the image to transfer onto the concrete substrate. Depending on the surface roughness of the concrete substrate before the transfer, the surface of the concrete substrate may be coated with a layer of gel-like material for better image receiving.

Figure 4:
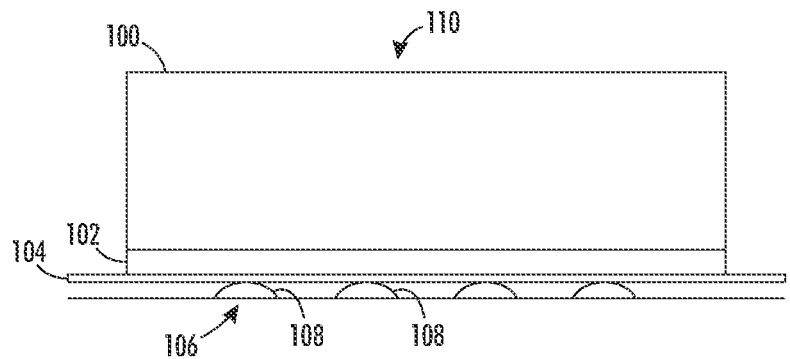
FIG. 4 is a side elevational view of a portion of an embodiment of a rubber presser used to apply a present transfer sheet to a concrete substrate.
Figure 5:
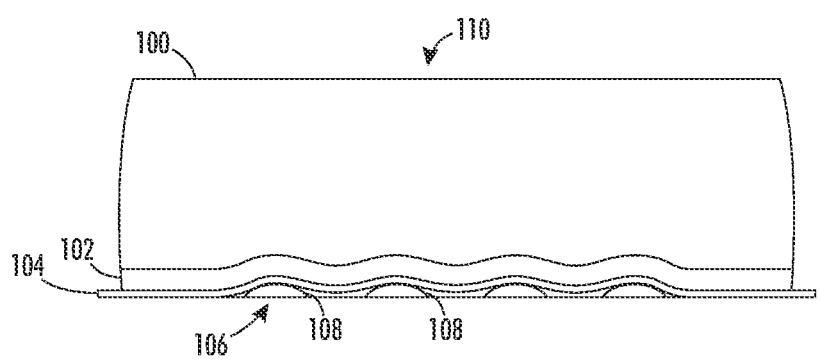
FIG. 5 is a side elevational view of a portion of an embodiment of a rubber presser used to apply a present transfer sheet to a concrete substrate where the presser has a first combination of durometers resulting in incomplete coverage of the transfer sheet on the substrate.
Figure 6:
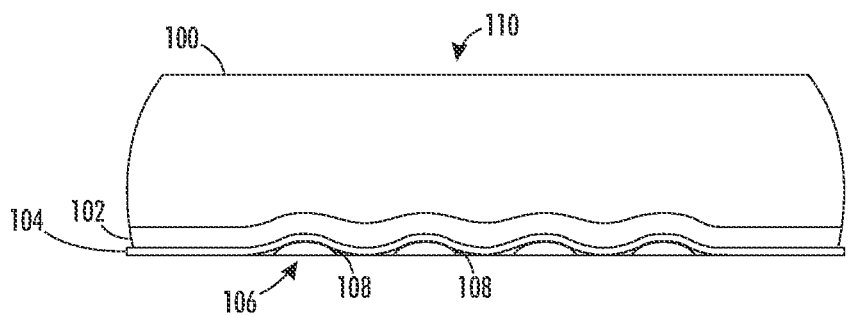
FIG. 6 is a side elevational view of a portion of an embodiment of a rubber presser used to apply a present transfer sheet to a concrete substrate where the presser has a second combination of durometers resulting in more complete coverage of the transfer sheet on the substrate.

To achieve sufficient pressure and image conformance to the concrete surface, a rubber layer can be used on the platen, roller or blade. It has been found that the platen, roller or blade can be configured such that a moderate total load is required to result in an application of 80 psi at the surface of the substrate. Excessive overall loads must be avoided or the mechanical frame of the pressing device may be adversely affected. In some embodiments, the rubber layer comprises a harder core for sufficient pressure and a softer, thin outer layer for image conformance. It has been found that the harder the inner core material is, the less load required to result in an 80 psi result. Thus, based on the irregularity of the substrate surface, the hardness of the inner core and outer surface are specifically selected to provide the lowest necessary overall load while maximizing the conformance of the outer layer to the substrate surface. If a pressure roller is used, the roller can be coated with two layers of rubber, i.e., a thick, harder inner layer for sufficient pressure and nip, and a thinner, soft outer layer for image conformance. To demonstrate this concept, a model was developed to simulate the conformance of the transfer sheet on an idealized rough concrete surface. Such modeling is depicted in FIGS. 4 through 6. Each of these models includes two layers of rubbers, i.e., inner layer 100 and outer layer 102, the transfer sheet, i.e., sheet 104, and the concrete surface roughness, i.e., concrete 106 having roughness or irregularities 108, wherein the surface roughness is modeled using several 1 millimeter (mm) wide, 0.25 mm tall spherical objects placed with 1 mm spacing. The foregoing models were used to identify the desired rubber modulus that satisfies the conformance requirement at a given pressure.

FIG. 4 shows a presser 110 in an uncompressed state. FIG. 5 shows the deformation of transfer sheet 104 on the surface of concrete 106 at 80 psi pressure, which is usually required to transfer the printed image from transfer sheet 104. The corresponding inner rubber layer 100 modulus is 6 megapascals (MPa) and the outer rubber layer 102 modulus is 1.5 MPa. As can be seen in FIG. 5, the conformance of transfer sheet 104 on concrete 106 is insufficient for proper image transfer. In other words, transfer sheet 104 does not touch the entire surface of concrete 106 between the two objects, i.e., simulated surface irregularities 108.

FIG. 6 shows the deformation of transfer sheet 104 with softer rubber layers at the same pressure. In this instance, the inner layer 100 modulus is 1 MPa and the outer layer 102 modulus is 0.25 MPa. With this configuration, transfer sheet 104 is better conformed to the surface of concrete substrate 106, i.e., transfer sheet 104 touches the entire surface of concrete 106 between simulated surface irregularities 108.

Figure 7:
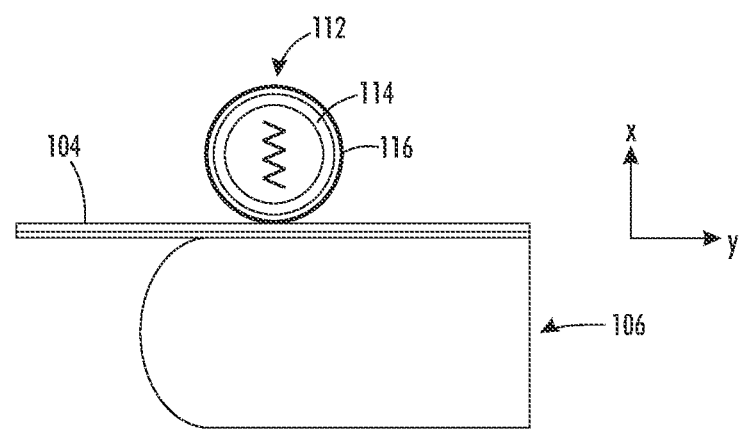
FIG. 7 is a side elevational view of a portion of an embodiment of a roller presser used to apply a present transfer sheet to a concrete substrate; and, FIG. 8 is an embodiment of an edge of a present transfer sheet.

It should be appreciated that other methods of transferring the printed image under heat and pressure may be used. For example, as shown in FIG. 7, heat and pressure may be applied to transfer sheet 104 using a compliant, heated roller 112. It should be appreciated that the foregoing roller application is substantially similar to the above described rubber pressers. In some embodiments, one or more rubber layers, e.g., inner layer 114 and outer layer 116, may be directly deposited on the outer surface of a heated roller.

A variety of advantages of using transfer sheets instead of direct printing on concrete have been found. Such advantages include but are not limited to: elimination of the need to transport formed or poured concrete to a print shop for subsequent processing; printing can occur parallel in time with concrete fabrication; greater flexibility in the selection of printing systems, e.g., web feed or flat bed systems are capable of printing transfer sheets; printing can be centralized, i.e., one printing system can supply transfer sheets for many concrete fabricators; and, transfer sheets are compatible with applying the image around corners, edges, and complex edge designs.

Figure 8:
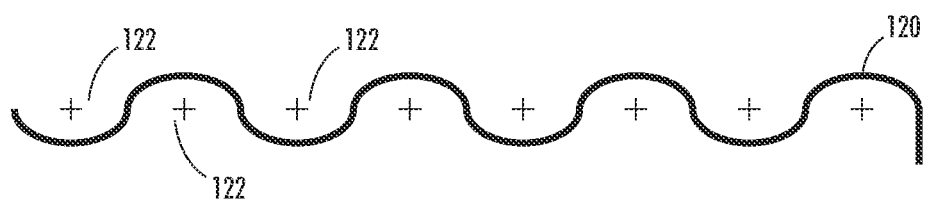

In some embodiments, the printing system may be narrower than the concrete substrate that will carry the image. It has been found that puzzle cuts with complex, non-uniform edges for the edges of two or more transfer sheets may be used where adjacent puzzle cuts must abut together to form the final imaged concrete. The use of a complex edge makes image discontinuity much more forgiving to visual detection as it disrupts your ability to perceive edges. FIG. 8 depicts a basic example of a puzzle cut arrangement comprising edge 120. It should be appreciated that FIG. 8 depicts a single embodiment of this feature and that other shapes are also possible, e.g., a saw tooth pattern, and such variations are within the spirit of the claims. It has been found that image discontinuity detection is also more forgiving because of the grainy appearance of concrete and typical noisy image patterns simulating natural granite and natural stone. Moreover, in some embodiments, fiducial marks 122 outside of the active image area can be used to align two or more transfer sheets.

In some embodiments, two or more transfer sheets are butted together to form the final imaged concrete; where part of the image density is transferred from one transfer sheet, while the remaining part of the image density is overlaid from a second transfer sheet. In other words, the image in the edge region is formed by the combination of two overlaid transfer sheets. It has been found that overlays using stochastic halftoning are more forgiving than with angled halftones.

In some embodiments, the decorated concrete surface is sealed with a glossy, satin, matte or flat finish after application of the decorative image. This finishing layer seals the concrete from liquids. To protect from color fading, the overcoat may include UV resistant additives. Such sealing or overcoat layers may be applied over a painted/coated substrate or alternatively may be applied over a transfer sheet.

The present embodiments possess a variety of advantages over the known systems and methods. Such advantages include but are not limited to: digital printing of the decorative image replaces the work of an artisan, so the process is faster and lower cost; an end user can proof the image before it is produced on concrete, with little or minimal variation between the proof and the digital image as opposed to a hand painted image; the same image can be used multiple times with better matching between each printed image; and, limitless designs can be produced. Decorating concrete provides significant value because concrete without decoration is not sufficiently attractive for many applications. Concrete work surfaces are advantageous over granite in cost and in durability, e.g., granite surfaces are prone to chipping.

The present system and method utilizes conventional inkjet or electrophotographic printing to produce images on concrete substrates. In some embodiments, inkjet imaging occurs directly on the concrete surface. The present inkjet system may include is adjustable angle printheads or a plurality of fixed printheads to print on the edges and backsplash. Color controls may be used to calibrate the present printing system to the color of the concrete substrate. In some embodiments, an image is printed on a transfer sheet using inkjet or electrophotographic technologies, followed by transfer of the image under heat and pressure to the concrete surface, while in some embodiments, puzzle cut edges of transfer sheets are used for butting two or more transfer sheets together to form the image on a piece of concrete wider than a single transfer sheet. The present method and system may be used to produce decorative concrete for countertops, work surfaces, flooring, walls, etc.

The present disclosure sets forth processes, materials and systems that use digital printers including inkjet or electrophotographic to decorate concrete surfaces. The difficulty of accommodating the roughness of a concrete surface has been addressed herein. Printing system hardware and materials configured for utilizing a transfer sheet are also disclosed herein. Images are printed on a transfer sheet, which is subsequently placed in contact with the concrete surface. A heat and pressure nip is formed with a surface fabricated with at least two layers of rubber where each layer has a different modulus selected to achieve desired conformance and pressure. It has been found that achieving adequate pressure in the valleys of the concrete surface roughness while maintaining nip loading in a reasonable range improves the outcome of the application of the transfer sheet. The present system and method enable digital printing on concrete, and broaden the application of printing technology.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for applying an image on a concrete substrate wherein the image forms a decorative coating, the method comprising:
depositing at least a portion of the image on a first transfer sheet; and,
securing the first transfer sheet to the concrete substrate, wherein the step of securing the first transfer sheet is performed using a heated presser, the heated presser comprising at least an inner polymer layer and an outer polymer layer, the inner polymer layer comprises a first modulus and the outer polymer layer comprises a second modulus, the first modulus is greater than the second modulus.

2. The method of claim 1 wherein an inkjet printing device or an electrophotographic printing device is used during the step of depositing at least a portion of the image on the first transfer sheet.

3. The method of claim 1 wherein the step of securing the first transfer sheet is performed by using at least one of: applying heat to the first transfer sheet and applying pressure to the first transfer sheet.

4. The method of claim 1 wherein the heated presser is selected from the group consisting of: a planar presser and a cylindrical presser.

5. The method of claim 1 further comprising:
depositing at least a portion of the image on a second transfer sheet; and,
securing the second transfer sheet adjacent to the first transfer sheet on the concrete substrate,
wherein the first transfer sheet comprises a first edge having a non-uniform shape and the second transfer sheet comprises a second edge having a non-uniform shape complimentary to the first edge non-uniform shape.

6. The method of claim 1 further comprising:
depositing at least a portion of the image on a second transfer sheet; and, securing the second transfer sheet adjacent to the first transfer sheet on the concrete substrate, wherein the first transfer sheet comprises a first edge having a first portion of the image and the second transfer sheet comprises a second edge having a second portion of the image and the combination of the first and second portions collectively form the image.

7. The method of claim 1 further comprising:

depositing at least a portion of the image on a second transfer sheet; and, securing the second transfer sheet adjacent to the first transfer sheet on the concrete substrate, wherein the first transfer sheet comprises a first edge having at least one fiducial marking, the second transfer sheet comprises a second edge having at least one fiducial marking, and the first transfer sheet is aligned with the second transfer sheet by aligning respective fiducial markings.

\* \* \* \* \*